April 4, 1944.   H. P. STABLER   2,346,117
WEIGHING SCALE
Filed Oct. 29, 1941   6 Sheets-Sheet 1
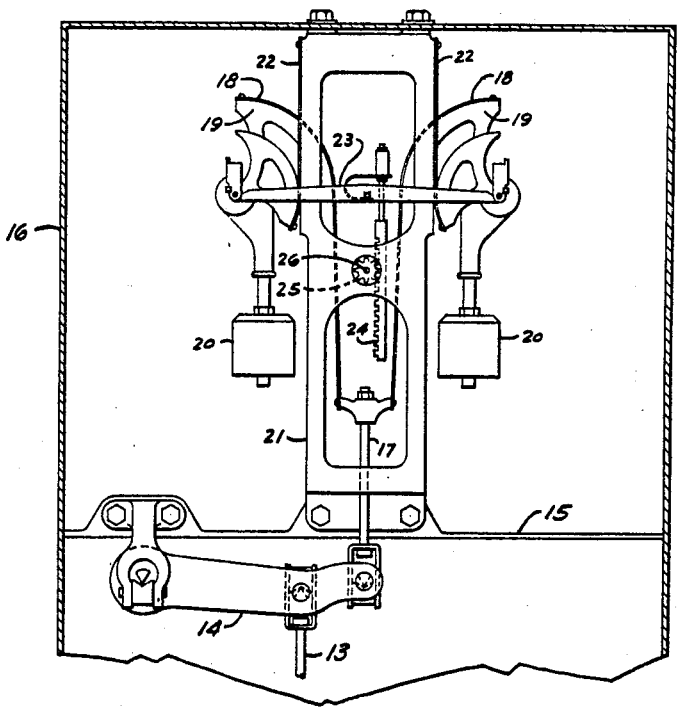
Fig. II
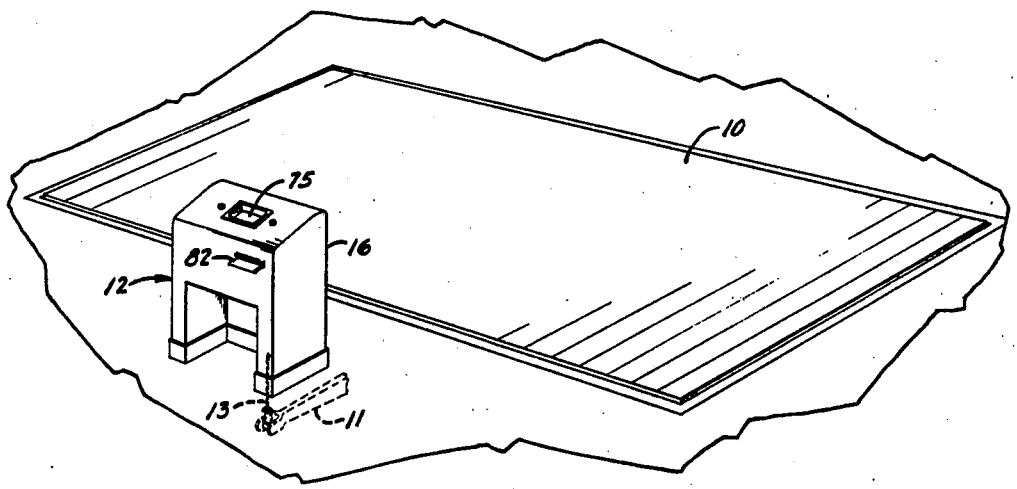
Fig. I
Howard Parker Stabler
INVENTOR
BY Marshall & Marshall
ATTORNEYS

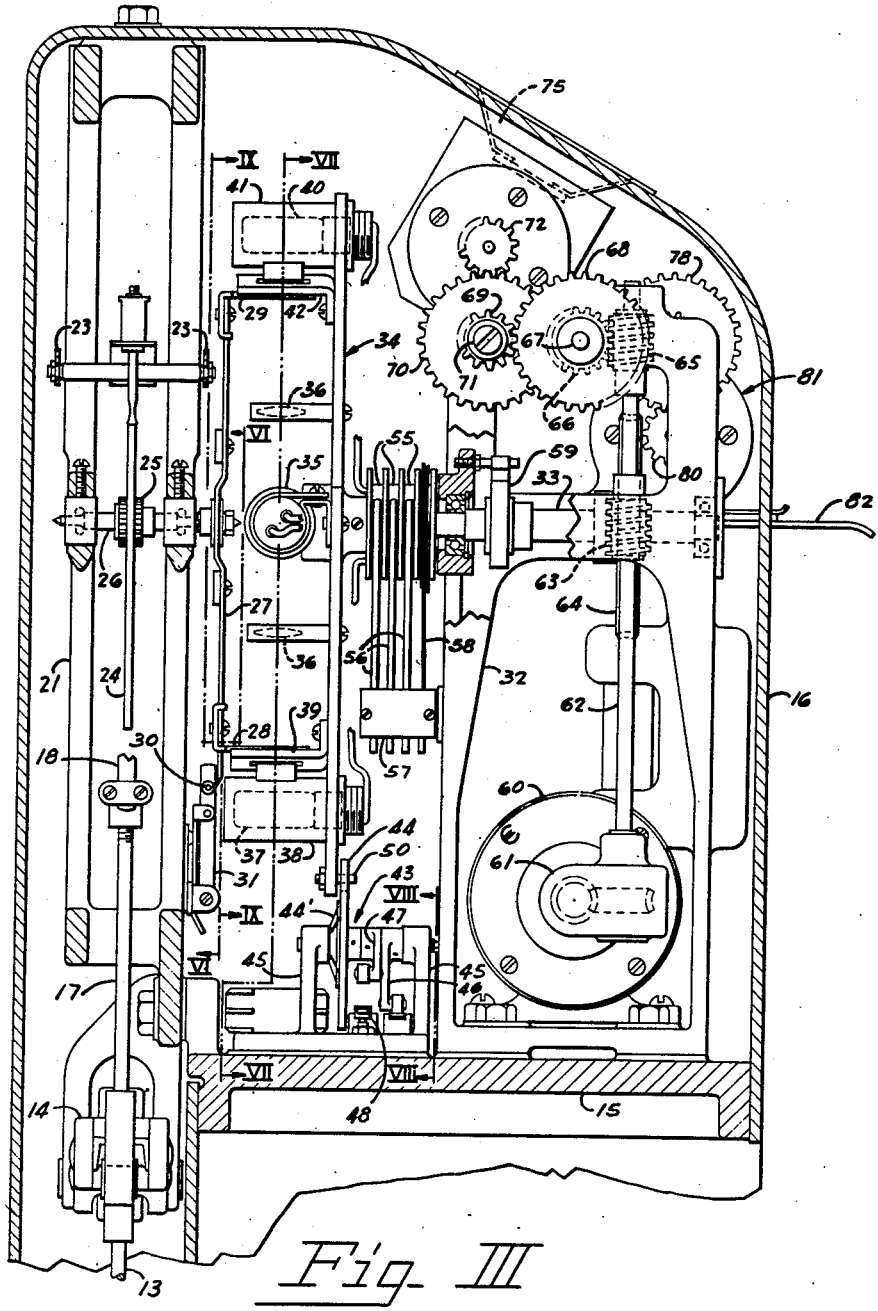
April 4, 1944.     H. P. STABLER     2,346,117
WEIGHING SCALE
Filed Oct. 29, 1941     6 Sheets-Sheet 2
Fig. III
Howard Parker Stabler
INVENTOR
BY Marshall & Marshall
ATTORNEYS

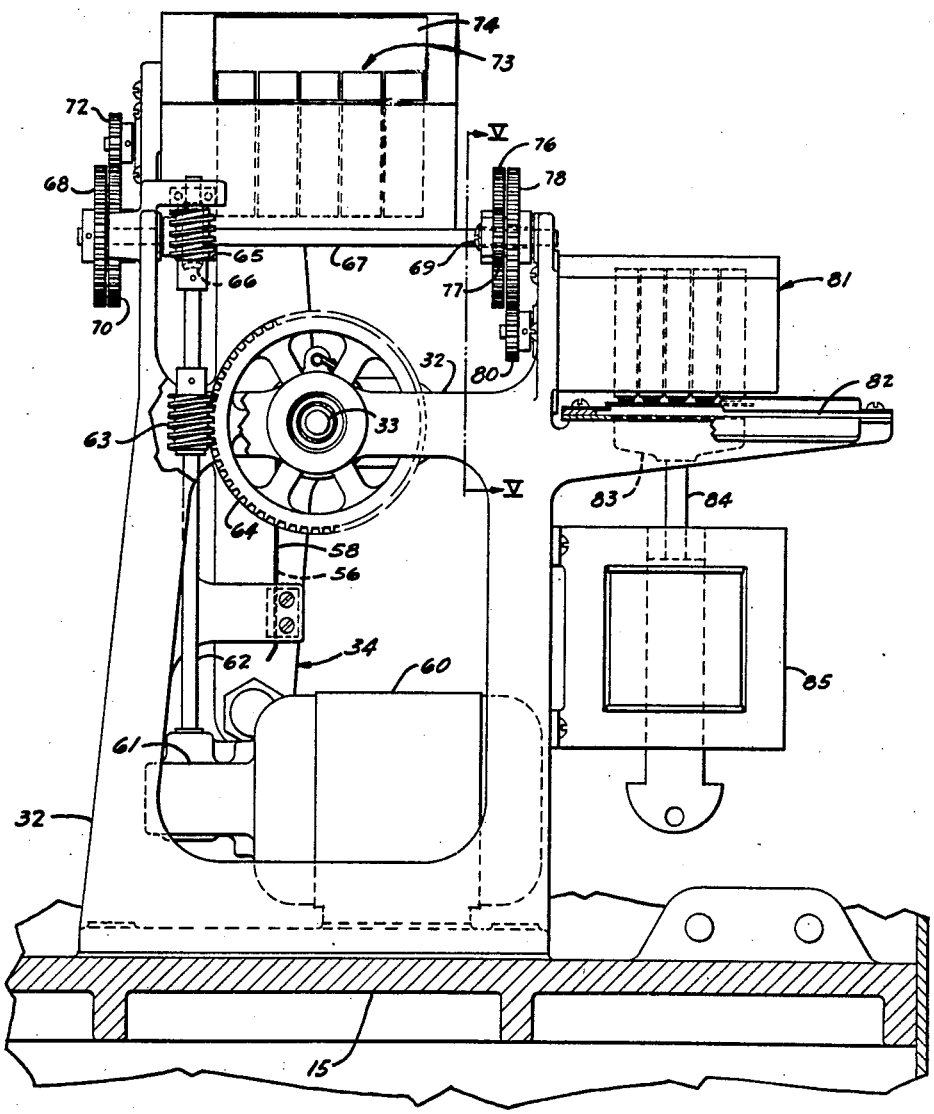
Fig. IV

April 4, 1944.   H. P. STABLER   2,346,117
WEIGHING SCALE
Filed Oct. 29, 1941   6 Sheets-Sheet 4
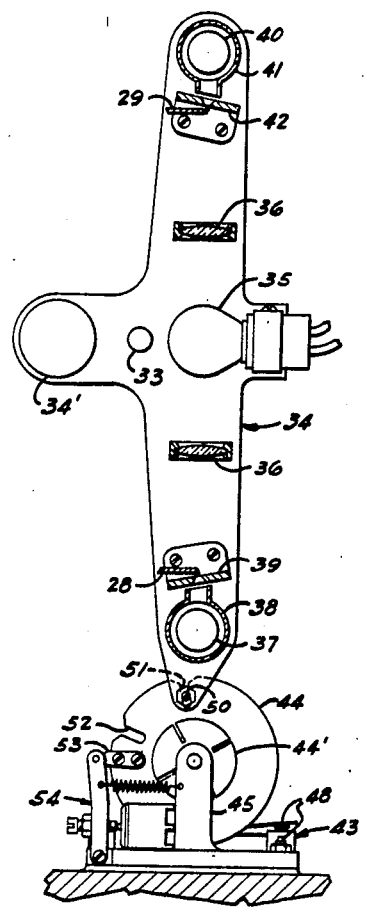
Fig. VII
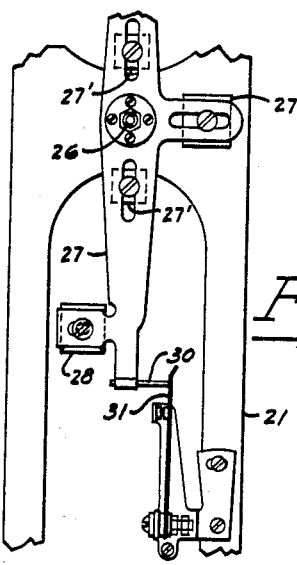
Fig. VI
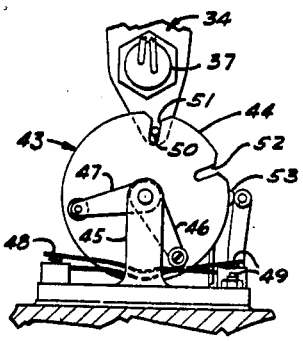
Fig. VIII
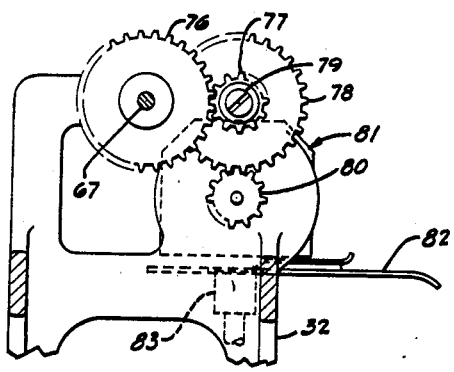
Fig. V
Howard Parker Stabler
INVENTOR
BY Marshall & Marshall
ATTORNEYS

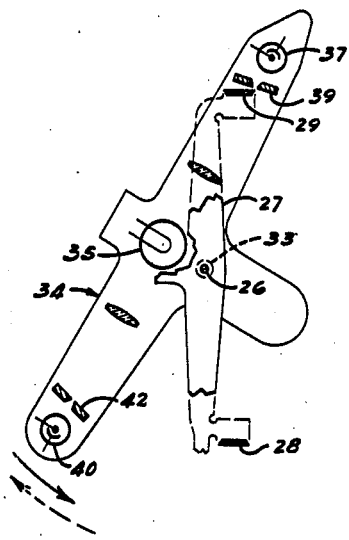
Fig. IX
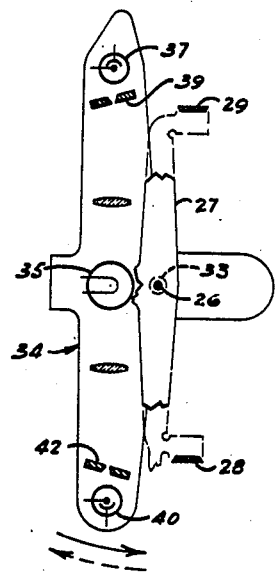
Fig. X
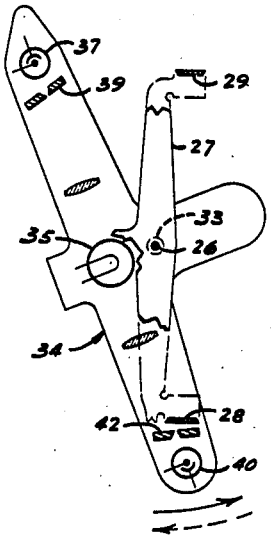
Fig. XI  Howard Parker Stabler
INVENTOR
BY Marshall & Marshall
ATTORNEYS

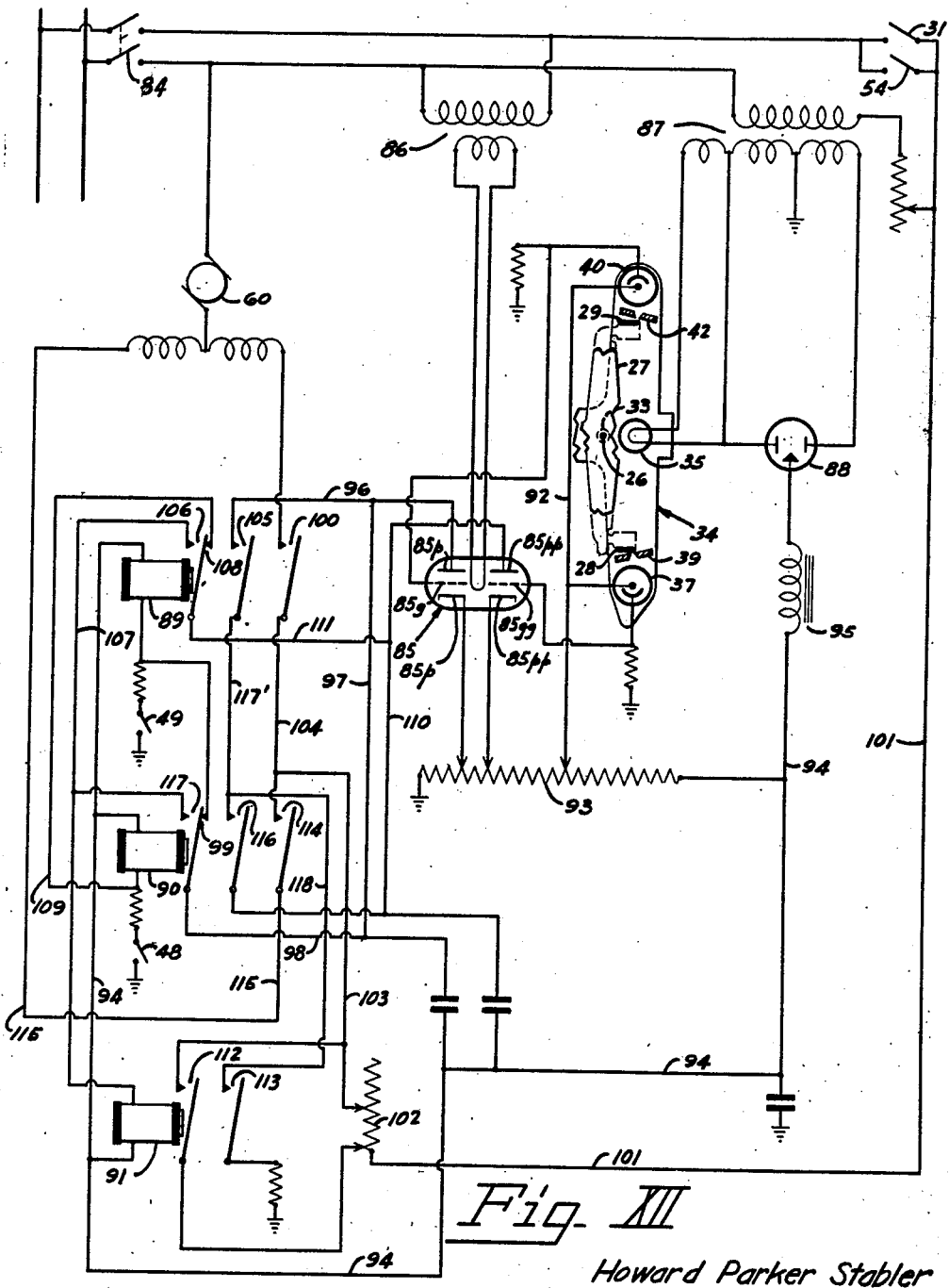

Patented Apr. 4, 1944

2,346,117

UNITED STATES PATENT OFFICE 2,346,117

WEIGHING SCALE

Howard Parker Stabler, Williamstown, Mass., assignor to Toledo Scale Company, Toledo, Ohio, a corporation of New Jersey Application October 29, 1941, Serial No. 416,972

18 Claims. (Cl. 265—5)

This invention relates to weighing scales, and more particularly to the type of weighing scales which print a record of the weight of the merchandise weighed thereon as well as indicate the weight of such merchandise.

Printing scales of many kinds have been designed but their construction presents many difficulties which have made them complicated and not entirely satisfactory. It is necessary that any auxiliary equipment in a scale of this kind be such that it will not create friction nor exert any reaction on the load counterbalancing mechanism which will destroy the scale's accuracy. Printing scales, in general, may be divided into three types. First, those in which the type bearing members are extremely light in weight and moved directly by the load counterbalancing mechanism itself. Second, those in which selecting mechanism "feels" out the position of the counterbalancing mechanism and in so "feeling" or sensing this position moves the indicia or type bearing members to the correct position. Third, those in which an auxiliary "follower" mechanism is used to follow-up the movement of the load counterbalancing mechanism and to move the auxiliary printing or indicia positioning mechanism.

The limitations of the first type of mechanism are primarily ones of weight and mass. Therefore, scales of this type are restricted as to the size and number of indicia which can be positioned for printing or indicating purposes.

The difficulties encountered in the design and use of selecting mechanisms are usually caused by their highly complicated structure and great number of mechanical parts which, if permitted to get even slightly out of adjustment, either cause inaccuracy in operation or fail to function at all. For these reasons, scales so designed have not met with great commercial acceptance.

In the follower type of printing scale, the primary difficulty has been in the construction of the follower itself. If the follower mechanism is not sufficiently sensitive, it will not react to small variations of weight and will fail to reach an accurate position while following the counterbalancing mechanism. If, on the other hand, it is made too sensitive, it will have a tendency to oscillate from one side of the correct position to the other without coming to rest. This condition is known as "hunting."

The difficulties then in the construction of scales of the "follower" type are the securing of sufficient sensitiveness in the mechanism to enable accurate following of the load counterbalancing mechanism and yet the prevention of "hunting."

Follower mechanisms which are moved manually into position have been constructed. This usually eliminates the objectionable "hunting" tendency and permits the position indicating device to be highly sensitive for close tolerances between the final position of the scale mechanism and the follower mechanism but a scale so designed requires an additional time consuming manual operation. Therefore, such scales have never been commercially successful.

Automatically operable mechanisms have also been constructed but, in general, they have been slow of operation and relatively inaccurate. The slow operation usually is caused by the fact that the follower device must trail along behind the weighing mechanism and in addition must be moved at a slow enough speed at the time of approach to the correct position to permit the operation of the device which brings it to a halt or, if it passes the correct position, reverses its direction of movement to return it to the correct position. Inaccuracy usually results from inability to closely adjust and define the sensing portions of the follower mechanism and, at the same time, prevent "hunting."

"Follower" mechanisms must operate rapidly so as not to impede the use of the scale, must be sensitive enough to detect small variations in the position of the counterbalancing mechanism, must accurately follow the counterbalancing mechanism both when loads are being placed upon the scale and when they are being taken off the scale, and must not hunt or oscillate around the load counterbalancing mechanism when the scale is at rest.

It is an object of this invention to provide a weighing scale, the weight indication of which can be read in large clear figures, or can be printed in equally large and equally clear figures on a form, an invoice or a card.

It is another object of this invention to provide a printing scale in which the movement of the printing equipment will not react on the load counterbalancing portion of the scale to create friction and cause errors.

It is another object of this invention to provide a weighing scale having printing mechanism actuated by an automatic "follower" device which will not hunt.

It is a further object of this invention to provide a weighing scale having a follower actuated printing mechanism which will automatically and accurately follow the movement of the load counterbalancing portion of the scale and come to a stop in sufficiently exact position to give a degree of accurateness within commercial tolerances.

It is still another object of this invention to provide a weighing scale equipped with weight printing mechanism, the operation of which is rapid enough to meet commercial requirements and yet which operates slowly enough at the critical points in its cycle to permit accurate and positive control.

More specific objects and advantages are apparent from the description, in which reference is had to the accompanying drawings illustrating a preferred form of scale embodying the invention.

In the drawings:

Fig. I is a view in perspective of a platform scale embodying the invention.

Fig. II is a view in elevation, on a greatly enlarged scale, of the load counterbalancing mechanism of the scale illustrated in Fig. I.

Fig. III is a view in vertical elevation, on a still larger scale, taken from the left end of the housing of the scale illustrated in Fig. I, the left housing cover being removed and parts of the frame being shown in section.

Fig. IV is a view in vertical elevation of a portion of the mechanism illustrated in Fig. III taken from the right-hand side of Fig. III with the covers removed, parts being shown in section.

Fig. V is a vertical sectional view taken on the line V—V of Fig. IV.

Fig. VI is a fragmentary view in elevation of a portion of the mechanism illustrated in Fig. III taken on the line VI—VI of Fig. III.

Fig. VII is a vertical sectional view taken on the line VII—VII of Fig. III illustrating a sensing portion of the mechanism illustrated in Fig. III.

Fig. VIII is a fragmentary view in elevation taken on the line VIII—VIII of Fig. III and illustrating a limit and reversing switch.

Fig. IX is a fragmentary somewhat diagrammatic view taken from the position shown by the line IX—IX of Fig. III and showing the mechanism in one of its critical operating positions.

Fig. X is a view, similar to Fig. IX, showing the mechanism in a slightly advanced position.

Fig. XI is another view, similar to Fig. IX, but showing the mechanism in a still further advanced position; and, Fig. XII is a schematic wiring diagram of the electrical circuit employed in the scale illustrated in Fig. I.

These specific drawings and the specific description that follows merely disclose and illustrate the invention and are not intended to impose limitations upon the claims.

A main platform 10 is supported on main levers (not shown), which are connected to an extension lever 11 extending outwardly from under the platform and beneath a scale weighing head 12. A vertical pull rod 13 is attached to the nose of the extension lever 11 and extends upwardly into the head 12. The upper end of the rod 13 (Fig. II) is pivotally connected to a pendulum lever 14 pivotally mounted below a shelf 15 within a housing 16 of the weighing head 12.

The force exerted on the pull rod 13 is transmitted through the lever 14, a second pull rod 17, vertically disposed metallic ribbons 18 attached thereto and sector cams 19, to load counterbalancing pendulums 20, which are suspended from a subframe 21, mounted on the shelf 15, the pendulums being suspended by means of metallic ribbons 22. Compensating bars 23 are mounted on the pendulums 20 and have resiliently connected to their center portions a vertically disposed rack 24. The rack 24 (Fig. III) engages a pinion 25 fixedly mounted on a shaft 26 which is rotatably mounted in the subframe 21. Mounted on the inner end of the shaft 26 is an arm 27 (Figures III and VI) which is rotatable in a vertical plane by the action of the rack 24 on the pinion 25. A sharp-edged vane 28 is adjustably mounted by means of a bolt and slotted hole near the lower end of the arm 27 at right angles to the face of the arm 27. A similar vane 29 is similarly mounted at the other end of the arm 27. Radially adjustable weights 27' are mounted on the arm for balancing the weight of the vanes 28 and 29. Also attached to the lower end of the arm 27 is a pin 30 (Fig. VI) which, when the arm 27 is in the zero position, holds open a master switch 31 mounted on the subframe 21.

A second subframe 32 is mounted on the shelf 15 and a shaft 33 is journaled in a cross spider near the upper end of the second subframe. The shaft 33 is coaxially located with relation to the shaft 26. Mounted on that end of the shaft 33 nearer the arm 27 is a follower arm 34 (Figures III and VII).

A lamp 35 is mounted at the center point of the arm 34 with its filament on a line passing to one side of the axis of the shaft 33 (Fig. VII). Also mounted on this line are lenses 36, one on each side of the lamp 35. A light sensitive photoelectric cell 37 is mounted near the lower end of the arm 34 and protected by a shield 38 and a slotted bracket 39 from receiving any light rays except those focused on the slot in the bracket 39 by the lens 36 associated therewith. A second photoelectric cell 40 is mounted near the upper end of the arm 34 and protected by a similar shield 41 and slotted bracket 42. A counterweight 34' is mounted on the arm to balance the weight of the cells, brackets, lenses and lamps. When the mechanism is at rest, the sharp edge of the vane 28 just covers the slot in the bracket 39 and similarly the edge of the vane 29 covers the slot in the bracket 42. This prevents light rays from the lamp 35, focused by the lenses 36, from entering the photoelectric cells 37 and 40.

The vanes 28 and 29 are so mounted on the arm 27 that their leading edges, which just cover the slots in the brackets 39 and 42 when the mechanism is at rest, are less than 180° apart and are both located on the same side of a line passing through the center of the shaft 33 which is parallel to a line connecting the two leading edges. The covering edge of the vane 29 (Fig. VII) extends from the arm 27 in a clockwise direction and that of the vane 28 extends in a counterclockwise direction.

Similarly a line connecting the slots in the brackets 39 and 42 would pass to one side of the center of the shaft 33.

Mounted on the shelf 15, below the plane of movement of the arm 34, is a rotary limit and reversing switch 43 (Figures III, VII, VIII). A slotted disk 44 is mounted on an axle, supported in brackets 45, to rotate in a plane parallel to the plane of rotation of the follower arm 34. The disk 44 is held from rotating freely by friction between its surface and a friction washer 44' mounted between the disk 44 and one of the brackets 45. Two contact fingers 46 and 47 are fixedly attached to the disk 44 and serve to close limit switches 48 and 49. A pin 50, mounted in the lowermost end of the arm 34, is engageable in slots 51 and 52 cut in the disk 44. A lug 53 is located on the edge of the disk 44 and opens a second master switch 54 when the follower mechanism is at its zero position.

Mounted on the shaft 33 are contact disks 55 which are engaged by brushes 56 to carry current to the photoelectric cells. The brushes 56 are mounted in a bracket 57 attached to the subframe 32. Also mounted in the bracket 57 is a flexible lead 58 which is loosely wrapped around and connected to another contact disk 55 on the shaft 33. A coiled spring-like conductor 59 is similarly wound around and connected to the shaft 33 and fastened in the subframe 32. The lead 58 and the conductor 59 carry the current for the lamp 35. The conductor 59 also exerts a slight tension on the shaft 33 tending to turn it in one direction thus acting as an antibacklash attachment.

An electric motor 60 (Figures III, IV) is mounted on the base of the subframe 32 and drives, through a gear box 61, a vertical power shaft 62. Pinned on the shaft 62 is a worm 63 which is engaged with a worm gear 64 (Fig. IV), mounted on the end of the shaft 33 opposite from the follower arm 34. Also pinned on the shaft 62 is a second worm 65 which is engaged with a worm gear 66 mounted on a shaft 67 which is rotatably mounted in the subframe 32 at right angles to the shafts 33 and 62. A gear 68, mounted on the left-hand end of the shaft 67 (Fig. IV), drives a pinion 69 (Fig. III) which is integral with a second larger gear 70 rotatably mounted on a jackshaft 71 mounted in the subframe 32. The gear 70 is engaged with a pinion 72 fixed on the shaft of a counter 73. The counter 73 has an opening 74 in the upper portion of its housing which is located beneath a viewing aperture 75 in the housing 16. Indicia marked on the peripheries of the wheels of the counter 73 can thus be viewed from the exterior of the housing 16 by the operator of the scale.

A gear 76 (Figures IV and V) is fixed on the shaft 67, near its other end, and engages a pinion 77 integral with a gear 78 mounted on a jackshaft 79 and engaging in turn a pinion 80 mounted on the shaft of a second counter 81. The counter 81 has wheels corresponding to those in the counter 73 but having on their periphery, instead of printed indicia for reading, type for the imprinting of weights corresponding to those which the operator can view on the wheels of the counter 73. A guide 82 (Figures III, IV, V) is located beneath the wheels of the counter 81 and extends outside of the housing 16 (Fig. III) to permit the insertion of the impression receiving medium. A printing platen 83 is located beneath the wheels of the counter 81 on the end of a vertically extending core rod 84 of an actuating solenoid 85 which is mounted on the subframe 32.

By means of the gearing turned by the shaft 62 the indicia wheels of the counter 73 and the type wheels of the counter 81 are operated in unison with the follower arm 34, so that the position of the follower arm is always indicated by the counter 73 and may be printed at any time from the type of the counter 81.

When a load has been weighed upon the scale, and the follower mechanism has come to rest, the operator inserts a card or invoice in the guide 82 beneath the wheels of the counter 81 and closes a circuit energizing the solenoid 85 which thrusts the core rod 84 and the platen 83 upwardly and squeezes the card against the wheels of the counter 81 to receive an impression of the type thereon to show the weight of the material on the scale.

The wiring circuit to operate the solenoid 85 is not shown in any of the views included herewith but consists of only a power input and a manually operated switch in series with the solenoid 85. This manually operated switch may be located in any convenient place, preferably on the exterior of the housing 16.

Fig. XII is a schematic wiring diagram of an electrical circuit designed to operate the mechanism just described. The pieces of electrical apparatus not yet described, and which are shown in the wiring diagram, are as follows: A master switch 84, a photoelectric cell amplifying tube 85, a heater transformer 86 for the heating element of the tube 85, and a power transformer 87, which has secondary coils connected to the filament of the lamp 35 already described and to a rectifier tube 88 which supplies the current for operating the device. The center tap of the transformer 87 is grounded. Also employed in the device are three multiple contact relays 89, 90 and 91. In addition to these electrical units, various resistances, variable and fixed, and various condensers and coils are also used and will be described under the operation of the device.

*Operation*

With the master control switch 84 closed, the only energy which enters the device is through the transformer 86 to the heater of the vacuum tube 85. Thus only a very small amount of power is used when the scale is at rest at zero position. As soon as a load is placed upon the load receiver, the counterbalancing mechanism turns the arm 27 which, as it leaves its rest position at zero, permits the switch 31 to close thus allowing current to enter the rest of the electric circuit. Current then passes through the transformer 87 and lights the filaments of the lamp 35 and is rectified in the tube 88. The ground circuit is established in the usual manner by tapping the center portion of the secondary coil of the transformer 87 and connecting this lead to the ground. As the arm 27 turns (assuming that an increase in weight causes the arm to turn in a counterclockwise direction, Figures VII and XII), the vane 29 is removed from in front of the slot in the bracket 42 and light enters the photoelectric cell 40. The photoelectric cell 40 is connected, through a lead 92, to a resistance 93, which is connected to a power lead 94 from a choke 95 and the rectifier tube 88. The end of the resistance 93 opposite its connection to the power lead 94 is grounded and therefore the resistance 93 constitutes a voltage divider. The cathode of the cell 40 is connected through a high resistance to the ground and to a grid 85g of the amplifying tube 85. This conditions that portion of the tube so that current now passes from the resistance 93, through a connection, to the electrodes 85p associated with the grid 85g in the tube 85. Current flows between the two electrodes and through a lead 96, a lead 97 and a lead 98, through a normally closed contact 99 of the relay 90, to the energizing coil of the relay 89 and then through the lead 94 to the rectifier 88. This causes the relay 89 to close its normally open motor contact 100 and current flows from the main line through the master switch 31, a lead 101, a resistance 102, leads 103 and 104, and the now closed contact 100 to the counterclockwise motion coils of the motor 60 and through the motor to the opposite side of the line. The motor thus revolves at low speed turning the follower arm 34 in a counterclockwise direction.

Energization of the coil of the relay 89 has also closed a normally open contact 105 of the relay 89 and a normally open contact 106 which is connected, through a lead 107, to the coil of the relay 91. A normally closed contact 108 of the relay 89, which is connected through a lead 109 to the energizing coil of the relay 90, has been opened.

Further movement of the arm 27 in the same direction, which moves the vane 28 beyond the slot in the bracket 39, permits light to enter the photoelectric cell 37. The anode of the cell 37 is connected to the lead 92 and its cathode to a grid 85gg in the tube 85. This lead between the cathode of the cell 37 and the grid 85gg is connected, through a high resistance, to the ground. This conditions electrodes 85pp for the passage of current, which flows from the resistance 93, through the electrodes 85pp, a lead 110, a lead 111, the now closed contact 106 and the lead 107 to the energizing coil of the relay 91 and then through the lead 94 as above described. This energizes the relay 91 and closes a normally open contact 112 which is shunted around the resistance 102 between the power lead 101 and the lead 103 which is now connected to the motor. This causes the motor to rotate at a higher rate of speed and to turn the follower arm 34 at a higher speed. A normally open contact 113 of the relay 91 also closes.

If we assume that the arm 27 is now stopped, the follower arm 34 will catch up with the arm 27 and the vane 28 will cut off the light falling on the cell 37. This will stop the flow of current between the electrodes 85pp, the leads 110 and 111, the contact 106 and the lead 107 and thus de-energize the relay 91 permitting the contact 112 to open which forces the current flowing to the motor 60 to pass through the resistance 102, thus reducing the speed of the motor. The motor now moves a little further and the arm 34 swings the bracket 42 sufficiently so that the vane 29 cuts off the light entering the cell 40. This de-energizes the relay 89 (by reversal of the steps described above) and the motor is de-energized.

However, momentum of the apparatus might move the arm 34 far enough to permit light to enter the cell 37, in which case its connections to the grid 85gg condition the tube 85 to permit current to flow from the resistance 93 between the electrodes 85pp, through the leads 110 and 111, the normally closed contact 108 and the lead 109 to the energizing coil of the relay 90 and then to the lead 94 and the rectifier 88. This energizes the relay 90 and closes a normally open contact 114 and current flows from the power lead 101, through the resistance 102, lead 103, the contact 114 and a lead 115 to the clockwise direction coils of the motor 60 and then to the other side of the line. Energization of the relay 90 also closes a normally open contact 116 and a normally open contact 117 which is connected through the lead 107 to the energizing coil of the relay 91. The energization of the relay 90 has also opened the normally closed contact 99 connected to the coil of the relay 89. If the follower arm 34 has moved but a slight distance beyond the arm 27, and light has been admitted only to the cell 37, this movement in the clockwise direction will be at a slow speed. If, however, the arm 34 is moved far enough to permit light to enter the cell 40, after having entered the cell 37, motion will continue in a clockwise direction but, due to the closing of the contact 117 of the relay 90, the current, which is conditioned to flow between the electrodes 85p by the cell 40 connected to the grid 85g, will flow through the lead 96, the lead 97, the lead 98, the closed contact 117 and the lead 107 to the energizing coil of the relay 91 which will close the contact 112 and shunt out the resistance 102 resulting in a higher speed of the motor as described above.

The follower arm 34 will thus return to the position of the arm 27, past which it was carried by its momentum, and if it does not return with sufficient momentum to once more pass the position of the arm 27, cutting off the light to the cell 40 will slow down the speed of the motor and the subsequent cutting off of the light to the cell 37 will bring the mechanism to a stop. If, however, momentum carries it past the arm 27, the operations above described will be repeated with the angles through which the arm 34 is swung rapidly decreasing until the momentum of the mechanism is insufficient to uncover more than one of the photoelectric cells and finally until it is insufficient to uncover either of the photoelectric cells, at which point the device will be at rest.

The number of oscillations of the follower arm 34 around the rest position of the arm 27, moved by the load counterbalancing mechanism, depends upon the adjustment of the vanes 28 and 29 with respect to the slots in the brackets 39 and 42 respectively.

At the time the follower arm 34 first left its zero position, it rotated, by means of the pin 50 (Figures VII and VIII) in the slot 51, the disk 44, which moved the lug 53, and permitted the master switch 54 to close. During the operations just described therefore both the switches 31 and 54 were closed.

The material weighed on the scale is now removed from the platform and the load counterbalancing mechanism swings the arm 27 in a clockwise direction (Fig. XII), returning it to its zero position. This moves the vane 28 away from in front of the slot in the bracket 39 and the light strikes the cell 37 which, as explained above, energizes the motor to rotate the arm 34 in a clockwise direction. If the arm 27 is moved far enough ahead of the follower arm 34, the vane 29 will also uncover the slot in the bracket 42 and light striking the cell 40 will energize it to result in the energization of the relay 91 and the resulting higher speed of the motor. The follower mechanism will come to rest at the zero position in the same manner as it was previously described as coming to rest in weighing position. The return of the arm 27 to its zero position opens the master switch 31 (Fig. VI) and the return of the follower arm 34 to zero moves the disk 44 (Fig. VII) which, through the lug 53, opens the master switch 54, cutting off the power from the entire system except the heater of the tube 85 which is connected to the transformer 86 and maintains the mechanism in readiness for future use.

It may sometimes happen that after the material has been placed upon the platform, the arm 27 has been rotated in a counterclockwise direction and the follower arm 34 has started to follow thereafter, the material may be removed from the platform before the follower arm has come to rest. In this event, it may happen that the arm 27 will be returning in a clockwise direction while the follower arm 34 is moving in a counterclockwise direction. If the arm 27 passes the follower arm 34 at a low rate of speed, it will have the same result as if the follower arm were carried past the arm 27 by the momentum of the mechanism, and the direction of movement of the follower arm will be at once reversed to cause it to return to zero along with the arm 27 as above described. If, however, the arm 27 passes the follower arm 34 at too high a rate of speed to permit the photoelectric cells to energize the correct relays (the relay closing the contact for clockwise movement of the motor cannot be energized until the other relay has set up the proper circuit), light will continue to fall on the cells as it did before the rapid passage of the arm 27 in the opposite direction and the follower arm 34 will continue to move in a counterclockwise direction.

The arm 27, and its vanes 28 and 29, will not be in the proper position to stop the mechanism in the normal way; therefore, provision must be made both to prevent the passage of the arm 27 past the follower arm 34 at 180° from coincidence from having any effect upon the movement of the follower arm 34 and also for reversing the direction of movement of the follower arm 34 when it has reached its limit of travel.

If it is assumed that the arm 27 has returned to its zero position, when the follower arm 34 approaches 180° away from coincidence, the relative position of the parts will be as shown in Fig. IX. In this figure, the direction of movement of the follower arm 34 is counterclockwise as indicated by the solid arrow. The vane 29 on the arm 27 covers the slot in the bracket 39 and cuts off light from the photoelectric cell 37. This stops the flow of current across the plate 85*pp*, through the circuit of the lead 110, the lead 111, the contact 106 and the lead 107 which de-energizes the relay 91 connected thereto. This causes the motor to slow down but it continues to turn at the lower speed.

In Fig. X, the two arms are shown at 180° from coincidence. The bracket 39 and cell 37 have moved past the vane 29 and light is once more entering the cell 37 which has re-energized the relay 91 to cause the motor to move at high speed. The motor only turns at the lower speed for the very brief interval during which the vane 29 cuts off light to the cell 37.

In Fig. XI, the follower arm 34 has been moved further and the vane 28 covers the slot in the bracket 42, cutting off light to the cell 40. This stops the flow of current between the electrodes 85*p* and would cause de-energization of the coil 89 by cutting off the flow of current through the leads 96, 97, 98 and the contact 99, except for the fact that the contact 113 of the relay 91 was closed upon the re-energization of the relay 91 just described. Closing of this contact 113, establishes a circuit from the ground, through the contact 113, the lead 118, the lead 117′, the contact 105, the lead 96, the lead 97, the lead 98, the normally closed contact 99 of the relay 90, the coil of the relay 89 and the lead 94 to the rectifier 88. This circuit just described acts as a "hold in" circuit for the coil of the relay 89 and assures continuing movement of the follower arm 34 in a counterclockwise direction even though light is cut off from the cell 40 and consequently current does not flow between the electrodes 85*p*. Thus the follower arm 34 continues to be rotated in a counterclockwise direction until it reaches the limit of its travel.

If the "hold in" circuit just described did not exist, when the follower arm 34 reached the position shown in Fig. XI, the covering of the cell 40 and stoppage of the flow of current between the electrodes 85*p* would de-energize the coil of the relay 89. With light being incident at this same time on the cell 37, the relay 90 would immediately be energized and the direction of movement of the arm 34 would be reversed. To this extent such reversal of direction would be desirable, but subsequent movement of the arm 34 in a clockwise direction (the direction of the broken arrow in Figures IX, X, XI) would swing it back to the position shown in Fig. IX. This would cut off light from the cell 37 and thus stop the flow of current between the electrodes 85*pp*, causing de-energization of the relay 90 and the immediate energization of the relay 89 which would start to turn the follower arm 34 in a counterclockwise direction. Thus, unless the "hold in" circuit above described existed, when the follower arm approached 180° away from coincidence with the arm 27, it would oscillate between the positions shown in Figures IX and XI.

The follower arm 34 continues to move in a counterclockwise direction (having been carried past 180° position with regard to the arm 27 by means of the "hold in" circuit) and finally reaches the limit of its movement in a counterclockwise direction. When the arm 34 originally left its rest position at zero, it rotated the disk 44 (Fig. VII) in a clockwise direction and thus moved the slot 52 upwardly and to the right a sufficient distance so that when the arm 34 reaches a position nearly 360° away from its starting position the pin 50 will enter the slot 52. This rotates the disk 44 further and (Fig. VIII) swings the finger 47 downwardly, thus closing the limit switch 48. The limit switch 48 (Fig. XII) is connected between the ground and the coil of the relay 90. Closing this switch energizes the coil of the relay 90, through the circuit to the ground, through the switch 48, the coil of the relay 90 and the lead 94 from the rectifier 88. Energization of the relay 90, opens the contact 99 which de-energizes the relay 89 and closes the contact 114 which leads to the clockwise direction coils of the motor. Thus the direction of movement of the follower arm 34 is reversed and it returns in a clockwise direction towards zero.

In returning towards zero, it passes through the positions shown in Figures XI, X and IX (in that order) and the "hold in" circuit above described once again insures that the follower arm 34 will continue past the 180° position. In Fig. XI, with the follower arm moving in the direction of the broken arrow, the vane 28 cuts off light to the cell 40 and thus stops the flow of current between the electrodes 85*p* which causes de-energization of the relay 91 and a slower speed of the motor. Movement in a clockwise direction continues through the position shown in Fig. X and to the position shown in Fig. IX. At this point, light is cut off from the cell 37 stopping the flow of current between the electrodes 85*pp* which would de-energize the relay 90 by cutting off current through the leads 110, 111, the contact 108 and the lead 109, except for the fact that the relay 91 has been re-energized at the position shown in Fig. X and has closed the contact 113 which sets up the "hold in" circuit to the ground, through that contact, the lead 118, the contact 116, the lead 110, the lead 111, the contact 108, the lead 109, the coil of the relay 90 and the lead 94 from the rectifier 88. The follower arm 34 thus continues to move in a clockwise direction until it reaches the rest position of the arm 27 and stops, as already described.

The reverse of the above described operations take place in the event that, after having removed a load from the scale, and the arm 27 and follower arm 34 having started to return toward zero in a clockwise direction, material is placed on the scale before the follower arm 34 has had time to reach the lower rest position of the arm 27. In this case, the follower arm 34 is moving in a clockwise direction and the arm 27 is moving in a counterclockwise direction. If the two arms pass at a slow speed, so that the relays have time to work, the direction of movement of the follower arm 34 is reversed and it moves with the arm 27 in a clockwise direction. If, however, the two arms pass at too high a rate of speed to permit the relays to operate, the follower arm 34 continues to move in a clockwise direction and may pass the arm 27 at 180° from coincidence (in which case the "hold in" circuit, as above described, will carry it past this position) continuing to move in a clockwise direction until it reaches the limit of its travel in that direction.

At this point (normally at zero position), the pin 50 will enter the slot 51 and move the disk 44 in a counterclockwise direction (Fig. VII) which will swing the finger 46 (Figure VIII) downwardly and close the limit switch 49. The switch 49 (Fig. XII) is connected between the ground and the coil of the relay 89 and thus closes a circuit to the ground, through the switch 49, the coil of the relay 89 and the lead 94 from the rectifier 88. This energizes the coil of the relay 89, opens the contact 108, which de-energizes the relay 90, and also closes the contact 100 to the counterclockwise coils of the motor to reverse the direction of movement of the follower arm 34 and to move it in a counterclockwise direction toward the rest position of the arm 27 under the new load upon the scale. The follower arm 34 moves in a counterclockwise direction until it catches up with the arm 27 at which time it will come to a stop as already described.

The embodiment of the invention that has been disclosed may be modified to meet various requirements.

Having described the invention, I claim:

1. In a weighing scale, in combination, weighing mechanism including a load responsive member, an automatic follower mechanism including a follower, a driving motor and photoelectric elements selectively activated by slight movement of said member and successively activated by greater movement of said member, one of said elements being first activated upon movement of said member in one direction and the other of said elements being first activated upon movement of said member in the other direction and electrical means so connecting said elements to said driving motor that first activation of either of said elements causes said motor to move said follower in the corresponding direction and subsequent activation of the other of said elements causes said motor to move said follower in such direction at a higher rate of speed.

2. In a weighing scale, in combination, weighing mechanism including a load responsive member, an automatic follower mechanism including a follower, a driving motor and photoelectric elements selectively activated by slight movement of said member and successively activated by greater movement of said member, one of said elements being first activated upon movement of said member in one direction and the other of said elements being first activated upon movement of said member in the other direction and electrical means so connecting said elements to said driving motor that first activation of either of said elements causes said motor to move said follower in the corresponding direction and subsequent activation of the other of said elements causes said motor to move said follower in such direction at a higher rate of speed, said member, coming to rest at balance of said weighing mechanism and upon the approach of said follower to the position of rest of said member, successively de-activating said elements in the reverse order from which said elements were originally activated, such de-activation of the secondly activated of said elements causing said motor to move said follower at a slower rate of speed and such de-activation of the first activated of said elements de-energizing said motor.

3. In a weighing scale, in combination, weighing mechanism including a load responsive member, an automatic follower mechanism including a follower, a driving motor and photoelectric elements selectively activated by slight movement of said member and successively activated by greater movement of said member, one of said elements being first activated upon movement of said member in one direction and the other of said elements being first activated upon movement of said member in the other direction, electrical means so connecting said elements to said driving motor that first activation of either of said elements causes said motor to move said follower in the corresponding direction and subsequent activation of the other of said elements causes said motor to move said follower in such direction at a higher rate of speed and indicating means moved into the position corresponding to the balance position of said weighing mechanism by said follower, said weighing mechanism being reactively free from said indicating means.

4. In a weighing scale, in combination, a condition responsive element, an auxiliary mechanism including photoelectric control elements alternatively activatable by slight movement of said responsive element and successively activatable by greater movement of said responsive element, an actuator for said auxiliary mechanism, and electrical means so connecting said control elements to said actuator that activation of one of said control elements energizes said actuator for moving said auxiliary mechanism in one direction and activation of the other of said control elements energizes said actuator for moving said auxiliary mechanism in the other direction and successive activation of said control elements energizes said actuator for more rapidly moving said auxiliary mechanism in the direction established by that control element first activated.

5. In a weighing scale, in combination, a condition responsive element, an auxiliary mechanism including photoelectric control elements alternatively activatable by slight movement of said responsive element and successively activatable by greater movement of said responsive element, an activator for said auxiliary mechanism, and electrical means so connecting said control elements to said actuator that activation of one of said control elements energizes said actuator for moving said auxiliary mechanism in one direction and activation of the other of said control elements energizes said actuator for moving said auxiliary mechanism in the other direction and successive activation of said control elements energizes said actuator for more rapidly moving said auxiliary mechanism in the direction established by that control element first activated, said control elements being successively de-activated by said condition responsive element when said auxiliary mechanism approaches and reaches the rest position of said responsive element, that control element originally activated secondly being de-activated first for causing said actuator, through said electrical means, to move said auxiliary mechanism at a slower rate of speed and that control element originally activated first being de-activated second for de-energizing said actuator and bringing said auxiliary mechanism to a stop at a position corresponding to the rest position of said condition responsive element.

6. In a weighing scale, in combination, a condition responsive element, an auxiliary mechanism including photoelectric control elements alternatively activatable by slight movement of said responsive element and successively activatable by greater movement of said responsive element, an actuator for said auxiliary mechanism, electrical means so connecting said control elements to said actuator that activation of one of said control elements energizes said actuator for moving said auxiliary mechanism in one direction and activation of the other of said control elements energizes said actuator for moving said auxiliary mechanism in the other direction and successive activation of said control elements energizes said actuator for more rapidly moving said auxiliary mechanism in the direction established by that control element first activated, said control elements being successively de-activated by said condition responsive element when said auxiliary mechanism approaches and reaches the rest position of said responsive element, that control element originally activated secondly being de-activated first for causing said actuator, through said electrical means, to move said auxiliary mechanism at a slower rate of speed and that control element originally activated first being de-activated second for de-energizing said actuator and bringing said auxiliary mechanism to a stop at a position corresponding to the rest position of said condition responsive element, and indicating mechanism positionable by said auxiliary mechanism.

7. A condition responsive element, a follower therefor, auxiliary indicating means, an actuator for moving said follower and said indicating means to positions corresponding to the positions taken by said condition responsive element under condition changes, a pair of means mounted on said follower for sensing such condition changes, said sensing means being alternatively activatable by opposing movements of said responsive element with respect thereto, electrical means connected to said sensing means and to said actuator for energizing said actuator to move said follower in a direction determined by that one of said sensing means first activated by such movement of said responsive means, said sensing means being successively activated by greater movement of said responsive element for energizing said actuator to move said follower at a higher rate of speed in the direction determined by the first activated of said sensing means.

8. A condition responsive element, a follower therefor, auxiliary indicating means, an actuator for moving said follower and said indicating means to positions corresponding to the positions taken by said condition responsive element under condition changes, a pair of means mounted on said follower for sensing such condition changes, said sensing means being alternatively activatable by opposing movements of said responsive element with respect thereto, electrical means connected to said sensing means and to said actuator for energizing said actuator to move said follower in a direction determined by that one of said sensing means first activated by such movement of said condition responsive element, said sensing means being successively activated by greater movement of said responsive element for energizing said actuator to move said follower at a higher rate of speed in the direction determined by the first activated of said sensing means, said sensing means being successively deactivated in reverse order to that order in which originally activated for causing said actuator, through said electrical means, to move said follower at a slower rate of speed when said follower has almost reached a position corresponding to the rest position assumed by said condition responsive element and for de-energizing said actuator when said follower has reached a position corresponding to such rest position.

9. A condition responsive element movable through a circular path of more than 180 degrees, a follower therefor, auxiliary indicating means, an actuator for moving said follower and said indicating means to positions corresponding to the positions taken by said condition responsive element under condition changes, a pair of means for sensing such condition changes, said sensing means being mounted on said follower and alternatively activatable by opposing movements of said responsive element with respect thereto, electrical means connected to said sensing means and to said actuator for energizing said actuator to move said follower in a direction determined by that one of said sensing means first activated by such movement of said condition responsive element, said sensing means being successively activated by greater movement of said responsive element for energizing said actuator to move said follower at a higher rate of speed in the direction determined by the first activated of said sensing means, said electrical means including apparatus forming a "hold in" circuit for over-controlling said sensing means when said responsive element and said follower are at relative positions approximately 180 degrees from corresponding positions.

10. A condition responsive element movable through a circular path of more than 180 degrees, a follower therefor, auxiliary indicating means, an actuator for moving said follower and said indicating means to positions corresponding to the positions taken by said condition responsive element under condition changes, a pair of means for sensing such condition changes, said sensing means being mounted on said follower and alternatively activatable by opposing movements of said responsive element with respect thereto, electrical means connected to said sensing means and to said actuator for energizing said actuator to move said follower in a direction determined by that one of said sensing means first activated by such movement of said responsive means, said sensing means being successively activated by greater movement of said responsive element for energizing said actuator to move said follower at a higher rate of speed in the direction determined by the first activated of said sensing means, said electrical means including apparatus forming a "hold in" circuit for over-controlling said sensing means when said responsive element and said follower are at relative positions approximately 180 degrees from corresponding positions, and apparatus for over-controlling said sensing means for limiting and reversing the movement of said follower within approximately the limits of movement of said responsive element whereby relative movement of said responsive element and said follower in opposite directions caused by repeated alternate movements of said condition responsive element under repeated oppositely directed changes of such condition has no effect on the direction of movement of said follower and such direction of movement is reversed at such limits to return said follower toward a position corresponding with the position of said condition responsive element under the last of such repeated changes of condition.

11. In a weighing scale, in combination, weighing mechanism including a member movable through a circular path of more than 180 degrees in response to loads on said scale, an automatic follower mechanism including a follower, a driving motor therefor and photo-electric elements mounted on said follower and selectively activated by slight movement of said member and successively activated by greater movement of said member, one of said elements being first activated upon movement of said member in one direction and the other of said elements being first activated upon movement of said member in the other direction and electrical means so connecting said elements to said driving motor that first activation of either of said elements causes said motor to move said follower in the corresponding direction and subsequent activation of the other of said elements causes said motor to move said follower in such direction at a higher rate of speed, said member coming to rest at balance of said weighing mechanism and upon the approach of said follower to the position of rest of said member, successively de-activating said elements in the reverse order from which said elements were originally activated, such de-activation of the secondly activated of said elements causing said motor to move said follower at a slower rate of speed and such de-activation of the first activated of said elements de-energizing said motor, said electrical means being so connected that when said member and said follower are at relative positions approximately 180 degrees from corresponding positions a "hold in" circuit is formed to over-control said elements.

12. In a weighing scale, in combination, weighing mechanism including a member movable through a circular path of more than 180 degrees in response to loads on said scale, an automatic follower mechanism including a follower, a driving motor therefor and photo-electric elements mounted on said follower and selectively activated by slight movement of said member and successively activated by greater movement of said member, one of said elements being first activated upon movement of said member in one direction and the other of said elements being first activated upon movement of said member in the other direction and electrical means so connecting said elements to said driving motor that first activation of either of said elements causes said motor to move said follower in the corresponding direction and subsequent activation of the other of said elements causes said motor to move said follower in such direction at a higher rate of speed, said member coming to rest at balance of said weighing mechanism and upon the approach of said follower to the position of rest of said member, successively de-activating said elements in the reverse order from which said elements were originally activated, such de-activation of the secondly activated of said elements causing said motor to move said follower at a slower rate of speed and such de-activation of the first activated of said elements de-energizing said motor, said electrical means being so connected that when said member and said elements are at relative positions approximately 180 degrees from corresponding positions a "hold in" circuit is formed to over-control said elements, and apparatus for over-controlling said elements for limiting and reversing the movement of said follower within approximately the limits of movement of said movable member whereby relative movement of said movable member and said follower mechanism in opposite directions caused by repeated alternate movements of said movable member under repeated alternate changes in loads on said scale has no effect on the direction of movement of said follower and such direction of movement is reversed at such limits to return said follower toward a position corresponding with the position of said movable member in response to the last of such loads on said scale.

13. In a weighing scale, in combination, weighing mechanism including a load responsive member movable through a circular path, automatic follower mechanism including a follower, a driving motor therefore and sensing elements mounted on said follower, said load responsive member having a pair of opposingly disposed means each associated with one of said sensing elements for maintaining that one of said elements in de-activated condition when said responsive member and said follower are both at rest, said sensing elements being alternatively activated by slight movement of said responsive member and successively activated by greater movement of said responsive member, one of said elements being first activated upon movement of said responsive member in one direction and the other of said elements being first activated upon movement of said responsive member in the other direction and electrical apparatus so connecting said elements to said motor that first activation of either of said elements causes said motor to move said follower in the corresponding direction and subsequent activation of the other of said elements causes said motor to move said follower in such direction at a higher rate of speed.

14. In a weighing scale, in combination, weighing mechanism including a load responsive member movable through a circular path, automatic follower mechanism including a follower, a driving motor therefor and sensing elements mounted on said followed, said load responsive member having a pair of opposingly disposed means each associated with one of said sensing elements for maintaining that one of said elements in de-activated condition when said responsive member and said follower are both at rest, said sensing elements being alternatively activated by slight movement of said responsive member and successively activated by greater movement of said responsive member, one of said elements being first activated upon movement of said responsive member in one direction and the other of said elements being first activated upon movement of said responsive member in the other direction and electrical apparatus so connecting said elements to said motor that first activation of either of said elements causes said motor to move said follower in the corresponding direction and subsequent activation of the other of said elements causes said motor to move said follower in such direction at a higher rate of speed, said elements being successively de-activated in the reverse order to that in which first activated when said responsive member has reached a rest position and said follower approaches and reaches a corresponding position to first cause said motor to move said follower at a slower rate of speed and then to de-energize said motor, each of said elements being de-activated by that one of said opposingly disposed means associated with the other of said elements at rest position when said responsive member and said follower approach and pass through relative positions approximately 180 degrees from corresponding positions, said electrical apparatus being so connected that such de-activation of each of said elements by the non-associated one of said opposingly disposed means does not de-energize said motor.

16. In a weighing scale, in combination, weighing mechanism including a load responsive member movable through a circular path, automatic follower mechanism including a follower, a driving motor therefor and sensing elements mounted on said follower, said load responsive member having a pair of opposingly disposed means each associated with one of said sensing elements for maintaining that one of said elements in de-activated condition when said responsive member and said follower are both at rest, one of said sensing elements being first activated by movement of said responsive member in one direction and the other of said sensing elements being first activated by movement of said responsive member in the other direction and electrical apparatus so connecting said sensing elements to said motor that the first activated of said sensing elements causes said electrical apparatus to energize said motor for moving said follower in a direction corresponding to the direction of movement of said responsive member which caused such activation, the other of said sensing elements being activated by greater movement of said responsive member in the same direction for causing said electrical apparatus to energize said motor to move said follower in the same direction at a higher rate of speed, said sensing elements and said opposingly disposed means being so located with respect to the axes of said responsive member and said follower that when said member and said mechanism are at rest, lines connecting said elements and said means pass to one side of said axes and when said member and said mechanism are at relative positions 180 degrees from corresponding positions such lines are parallel and located one on each side of said axes.

16. In a weighing scale, in combination, weighing mechanism including a load responsive member movable through a circular path, automatic follower mechanism including a follower, a motor therefor and photoelectric sensing elements mounted on said follower, a light source, said load responsive member having a pair of vanes each disposed in the path of light from said source to one of said photoelectric sensing elements for maintaining that one of said elements in de-activated condition when said member and said mechanism are at rest, said vanes having their shielding edges opposingly directed and both extending to the same side of a line connecting said photoelectric elements when said member and said mechanism are at rest, said photoelectric elements being alternatively activatable by said light source by slight movement of said member and successively activatable by greater movement of said member, electrical apparatus so connecting said photoelectric elements to said motor that first activation of one of said photoelectric elements by movement of said member in one direction causes said motor to move said follower in the corresponding direction, and first activation of the other of said photoelectric elements by movement of said member in the other direction causes said motor to move said follower in a corresponding direction and successive activation of said photoelectric elements causes said motor to move said follower at a higher speed in the direction determined by the first activated of said photoelectric elements.

17. In a weighing scale, in combination, weighing mechanism including a load responsive member movable through a circular path, automatic follower mechanism including a follower, a motor therefor and photoelectric elements mounted on said follower, said load responsive member having a pair of opposingly directed vanes, one associated with each of said photoelectric elements, for shielding and preventing activation of said photoelectric elements when said member and said follower are at rest, said photoelectric elements being selectively activated by slight movement of said member and successively activated by greater movement of said member, said member being mounted coaxially with said follower, and electrical apparatus so connecting said photoelectric elements to said motor that movement of said member in one direction and the activation of one of said photoelectric elements caused thereby causes said motor to move said follower in a direction corresponding to the direction of movement of said member and successive activation of the other of said photoelectric elements causes said motor to move said follower at a higher rate of speed in such direction, said photoelectric elements being momentarily de-activated one at a time by that one of said vanes not associated therewith at rest when said member and said follower pass through relative positions approximately 180 degrees from corresponding rest positions, said electrical apparatus also including equipment forming a "hold in" circuit to maintain the direction of movement of said follower resulting from first activation of one of said photoelectric elements when the first activated of said photoelectric elements is de-activated by that one of said vanes not associated with said first activated photoelectric element when said member and said follower are at rest.

18. In a weighing scale, in combination, weighing mechanism including a load responsive member movable through a circular path, automatic follower mechanism including a follower, a motor therefor and photoelectric elements mounted on said follower, said load responsive member having a pair of opposingly directed vanes, one associated with each of said photoelectric elements, for shielding and preventing activation of said photoelectric elements when said member and said follower are at rest, said photoelectric elements being selectively activated by slight movement of said member and successively activated by greater movement of said member, said member being mounted coaxially with said follower, and electrical apparatus so connecting said photoelectric elements to said motor that movement of said member in one direction and the activation of one of said photoelectric elements caused thereby causes said motor to move said follower in a direction corresponding to the direction of movement of said member and successive activation of the other of said photoelectric elements causes said motor to move said follower at a higher rate of speed in such direction, said photoelectric elements being momentarily de-activated one at a time by that one of said vanes not associated therewith at rest when said member and said follower pass through relative positions approximately 180 degrees from corresponding rest positions, said electrical apparatus also including equipment forming a "hold in" circuit to maintain the direction of rotation of said motor and of movement of said follower resulting from first activation of one of said photoelectric elements when the first activated of said photoelectric elements is de-activated by that one of said vanes not associated with said first activated photoelectric element when said member and said follower are at rest, said photoelectric elements being successively de-activated upon approach of said follower to the position assumed by said member under the load on said scale in the reverse order from that in which originally activated, each by that one of said vanes associated therewith at rest, such de-activation of the second activated of said elements causing said electrical apparatus to energize said motor for movement of said follower at a slower speed and such de-activation of the first activated of said elements causing said electrical apparatus to de-energize said motor and bring said follower to rest with said member.

HOWARD PARKER STABLER.

CERTIFICATE OF CORRECTION.

Patent No. 2,346,117.  April 4, 1944.

HOWARD PARKER STABLER.

It is hereby certified that error appears in the printed specification of the above numbered patent requiring correction as follows: Page 8, second column, line 18, claim 12, strike out the word "mechanism"; and that the said Letters Patent should be read with this correction therein that the same may conform to the record of the case in the Patent Office.

Signed and sealed this 4th day of July, A. D. 1944.

Leslie Frazer
(Seal)   Acting Commissioner of Patents.